United States Patent
Tamura et al.

(10) Patent No.: US 10,544,968 B2
(45) Date of Patent: Jan. 28, 2020

(54) REFRIGERATION DEVICE (71) Applicant: Panasonic Intellectual Property Management Co., Ltd., Osaka-shi, Osaka (JP)

(72) Inventors: Tomoichiro Tamura, Kyoto (JP); Hidetoshi Taguchi, Osaka (JP); Bunki Kawano, Osaka (JP); Takahiro Matsuura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 373 days.

(21) Appl. No.: 14/904,878

(22) PCT Filed: Jul. 7, 2014

(86) PCT No.: PCT/JP2014/003594
§ 371 (c)(1),
(2) Date: Jan. 13, 2016

(87) PCT Pub. No.: WO2015/008452
PCT Pub. Date: Jan. 22, 2015

(65) Prior Publication Data
US 2016/0201956 A1    Jul. 14, 2016

(30) Foreign Application Priority Data

Jul. 17, 2013  (JP) ................................ 2013-148658

(51) Int. Cl.
F25B 39/00    (2006.01)
F25B 41/00    (2006.01)
(Continued)

(52) U.S. Cl.
CPC .............. *F25B 39/00* (2013.01); *F25B 41/00* (2013.01); *F25B 41/04* (2013.01); *F25B 49/022* (2013.01);
(Continued)

(58) Field of Classification Search
CPC .......... F25B 1/00; F25B 1/10; F25B 2400/13; F25B 41/04; F28B 1/00
See application file for complete search history.

(56) References Cited

U.S. PATENT DOCUMENTS 4,003,213 A    1/1977  Cox
5,755,104 A *  5/1998  Rafalovich ............. F25B 13/00
                                                    62/205
(Continued)

FOREIGN PATENT DOCUMENTS

CN    101737996    6/2010
CN    101788210    7/2010
(Continued)

OTHER PUBLICATIONS english translation of JP2008164187.*
(Continued)

*Primary Examiner* — Elizabeth J Martin
*Assistant Examiner* — Melodee Jefferson
(74) *Attorney, Agent, or Firm* — Hamre, Schumann, Mueller & Larson, P.C.

(57) ABSTRACT

A refrigeration apparatus includes a container such as an evaporator for holding refrigerant, and a compressor for compressing refrigerant vapor. The compressed vapor is returned to the container, and stored as liquid. The liquid refrigerant is withdrawn from the container and then returned to the container via a first path through a heat exchanger for cooling a space, or a second path that does not pass through the heat exchanger. Upon returning to the (Continued)

container, the liquid refrigerant is at least partly evaporated due to the reduced pressure in the container caused by the operation of the compressor, and the container is cooled by the latent heat of evaporation. Thus, the container can act as a cold storage unit. The cold storage effect is increased when the refrigerant is returned to the container via the second path.

15 Claims, 8 Drawing Sheets

(51) Int. Cl.
    *F25B 41/04*     (2006.01)
    *F25B 49/02*     (2006.01)
    *F25D 16/00*     (2006.01)
    *F25B 39/02*     (2006.01)

(52) U.S. Cl.
    CPC .............. *F25D 16/00* (2013.01); *F25B 39/02* (2013.01); *F25B 2339/024* (2013.01); *F25B 2600/0251* (2013.01)

(56) References Cited

U.S. PATENT DOCUMENTS

| | | | | |
|---|---|---|---|---|
| 6,023,935 | A * | 2/2000 | Okazaki | F25B 25/00 62/119 |
| 2003/0150233 | A1 | 8/2003 | Jensen et al. | |
| 2009/0071181 | A1 * | 3/2009 | Spanger | F24F 13/222 62/262 |
| 2009/0293507 | A1 | 12/2009 | Narayanamurthy et al. | |
| 2010/0042265 | A1 * | 2/2010 | Rigal | F25B 25/00 700/300 |
| 2011/0011119 | A1 * | 1/2011 | Kuehl | F25D 16/00 62/434 |
| 2011/0214435 | A1 | 9/2011 | Su | |
| 2014/0053595 | A1 * | 2/2014 | Kawano | F25B 43/006 62/498 |
| 2014/0053596 | A1 * | 2/2014 | Komori | F25B 1/10 62/498 |

FOREIGN PATENT DOCUMENTS

| | | | | |
|---|---|---|---|---|
| CN | 201561602 | | 8/2010 | |
| CN | 102147165 | | 8/2011 | |
| CN | 102620462 | | 8/2012 | |
| JP | 2000-204360 | | 7/2000 | |
| JP | 2000-337668 | | 12/2000 | |
| JP | 2002-317978 | | 10/2002 | |
| JP | 2004-340492 | | 12/2004 | |
| JP | 2006097989 | | 4/2006 | |
| JP | 2008-164187 | | 7/2008 | |
| JP | 2008164187 A | * | 7/2008 | ............... F25B 1/00 |
| JP | 2009-019857 | | 1/2009 | |
| JP | 2009-299920 | | 12/2009 | |
| JP | 2010230266 | | 10/2010 | |
| JP | 2012-233616 | | 11/2012 | |
| JP | WO 2012147366 A1 | * | 11/2012 | ............... F25B 1/10 |
| WO | 2012/147366 | | 11/2012 | |

OTHER PUBLICATIONS english translation of JP2008164187 2018.*
english translation of JP2008164187 (Year: 2018).*
Extended European Search Report issued in corresponding European Application, dated Jun. 3, 2016, 8 pages.
Search Report issued for Chinese Patent Application No. 201480040162.6, dated Dec. 27, 2016, 3 pages including English translation.
Electroheat, vol. 27, No. 4, pp. 30-37, 2006.

* cited by examiner

Prior Art

REFRIGERATION DEVICE

TECHNICAL FIELD

The present invention relates to refrigeration apparatuses.

BACKGROUND ART

As ice thermal storage type refrigeration apparatuses, refrigeration apparatuses using chlorofluorocarbons or chlorofluorocarbon alternatives as refrigerants are known. However, these refrigerants are responsible for problems such as ozone depletion and global warming. Patent Literature 1 describes a refrigeration apparatus using water as a refrigerant having a very small impact on the global environment.

Figure 8:
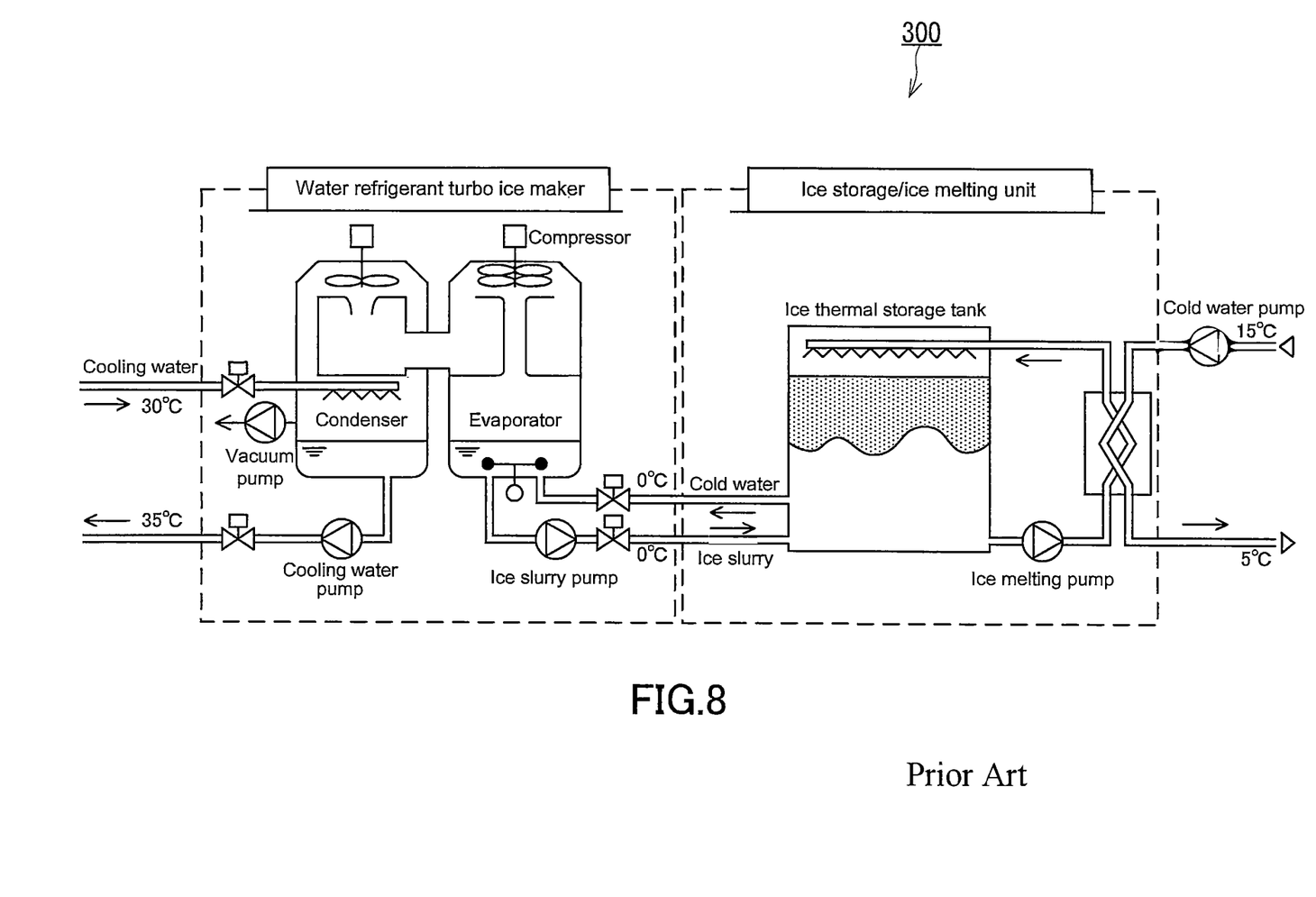
FIG. 8 is a configuration diagram of a conventional refrigeration apparatus.

As shown in FIG. 8, a refrigeration apparatus 300 of Patent Literature 1 is composed of a water refrigerant turbo ice maker and an ice storage/ice melting unit. The water refrigerant turbo ice maker is composed of a compressor, an evaporator, a condenser, an ice slurry pump, etc. The ice storage/ice melting unit includes an ice thermal storage tank, an ice melting pump, etc. In the ice storage operation, ice slurry produced in the evaporator is delivered to the ice thermal storage tank by the ice slurry pump and stored in the tank. In the space cooling operation, cold water in the ice thermal storage tank is delivered by the ice melting pump and used as a cold source for space cooling.

CITATION LIST

Non-Patent Literature

Non-Patent Literature 1: ELECTROHEAT, Vol. 27, No. 4, 2006, pp. 30-37

SUMMARY OF INVENTION

Technical Problem

The running cost of the refrigeration apparatus 300 of Patent Literature 1 can be reduced compared to that of ordinary turbo refrigerators. On the other hand, the initial cost of the refrigeration apparatus 300 is increased because it requires ancillary equipment such as the ice thermal storage tank and the ice slurry pump.

In view of the above circumstances, it is an object of the present invention to reduce the number of components of a refrigeration apparatus and the initial cost thereof.

Solution to Problem

The present disclosure provides a refrigeration apparatus including:

a container in which heat is stored using latent heat of a refrigerant;

a compressor that is connected to the container and allows latent heat of the refrigerant to be generated;

a heat exchange circulation path including: a heat exchanger; a feed flow path connecting an inlet of the heat exchanger and the container; and a return flow path connecting an outlet of the heat exchanger and the container, the heat exchange circulation path being adapted to allow a refrigerant liquid retained in the container to circulate via the heat exchanger;

a cold storage flow path that is a flow path used in a heat storage operation for storing cold energy in the container, the cold storage flow path connecting the feed flow path and the return flow path, the cold storage flow path being configured to allow the refrigerant liquid flowing from the container to return to the container without passing through the heat exchanger; and a flow path switching mechanism that selects one of the heat exchange circulation path and the cold storage flow path as a flow path into which the refrigerant liquid flowing from an evaporator should be introduced.

Advantageous Effects of Invention

With the above-described technology, it is possible to reduce the number of components of the refrigeration apparatus and the initial cost thereof.

DESCRIPTION OF EMBODIMENTS

A first aspect of the present disclosure provides a refrigeration apparatus including;

a container (evaporator) in which heat is stored using latent heat of a refrigerant;

a compressor that is connected to the container and allows latent heat of the refrigerant to be generated;

a heat exchange circulation path including; a heat exchanger; a feed flow path connecting an inlet of the heat exchanger and the container; and a return flow path connecting an outlet of the heat exchanger and the container, the heat exchange circulation path being adapted to allow a refrigerant liquid retained in the container to circulate via the heat exchanger;

a cold storage flow path that is a flow path used in a heat storage operation for storing cold energy in the container, the cold storage flow path connecting the feed flow path and the return flow path, the cold storage flow path being configured to allow the refrigerant liquid flowing from the container to return to the container without passing through the heat exchanger; and a flow path switching mechanism that selects one of the heat exchange circulation path and the cold storage flow path as a flow path into which the refrigerant liquid flowing from an evaporator should be introduced.

In the above refrigeration apparatus, cold energy is stored inside the container. The refrigerant liquid retained in the container circulates in the heat exchange circulation path between the container and the heat exchanger. In the heat exchanger, the cooling or heating capability is exhibited. As described above, according to the refrigeration apparatus of the first aspect, the container also serves as a heat storage tank and thus the heat storage tank can be omitted. Therefore, the number of components of the refrigeration apparatus and the initial cost thereof can be reduced.

A second aspect of the present disclosure provides the refrigeration apparatus according to the first aspect, wherein the container is an evaporator that retains the refrigerant liquid, the compressor draws a refrigerant vapor from the evaporator so as to evaporate the refrigerant liquid retained in the evaporator, and compresses the refrigerant vapor drawn from the evaporator, and the cold storage flow path is used in a cold storage operation for storing cold energy in the evaporator using latent heat of evaporation of the refrigerant liquid. According to the second aspect, cold is stored in the evaporator. A target (such as air in an indoor space) can be cooled using the stored cold energy.

A third aspect of the present disclosure provides the refrigeration apparatus according to the second aspect, wherein the compressor draws the refrigerant vapor from the evaporator so as to solidify, inside the evaporator, the refrigerant liquid retained in the evaporator, and in the cold storage operation, the refrigerant in solid form is stored in the evaporator. According to the third aspect, the refrigerant in solid form is stored in the evaporator. The remaining refrigerant liquid retained in the evaporator is cooled by the solid refrigerant. The refrigerant liquid thus cooled circulates in the heat exchange circulation path between the evaporator and the heat exchanger. In the heat exchanger, the cooling capability is exhibited. As described above, according to the refrigeration apparatus of the third aspect, the evaporator also serves as a cold storage tank and thus the cold storage tank can be omitted. Therefore, the number of components of the refrigeration apparatus and the initial cost thereof can be reduced. In particular, according to the third aspect, the solid refrigerant is stored inside the evaporator and thus a high cold storage density can be achieved.

A fourth aspect of the present disclosure provides the refrigeration apparatus according to any one of the first to third aspects, wherein the heat exchange circulation path has an upstream end connected to the container, and the cold storage flow path is a flow path that is branched from the heat exchange circulation path at a branch point between the inlet of the heat exchanger and the upstream end of the heat exchange circulation path so that the refrigerant liquid flowing from the container bypasses the heat exchanger and is returned to the container. The pressure loss of the refrigerant liquid can be reduced by allowing the refrigerant liquid to flow in the cold storage flow path so that it bypasses the heat exchanger. With the use of the flow path switching mechanism, the refrigerant liquid can be introduced selectively into a desired flow path, and therefore the operation mode can be reliably switched.

A fifth aspect of the present disclosure provides the refrigeration apparatus according to the fourth aspect, wherein the flow path switching mechanism includes a three-way valve provided at the branch point of the heat storage flow path from the heat exchange circulation path. It is desirable to use a three-way valve in terms of suppressing an increase in the number of components.

A sixth aspect of the present disclosure provides the refrigeration apparatus according to the fourth aspect, wherein the flow path switching mechanism includes: an on-off valve provided in the heat exchange circulation path at a position closer to the heat exchanger than the branch point of the heat storage flow path from the heat exchange circulation path; and another on-off valve provided in the cold storage flow path. An on-off valve is less expensive and more reliable than a three-way valve. In particular, when the refrigeration apparatus is operated under the pressure conditions lower than atmospheric pressure, it is desirable to use on-off valves in terms of improving the reliability.

A seventh aspect of the present disclosure provides the refrigeration apparatus according to any one of the first to sixth aspects, wherein the refrigerant liquid returned to the container via the heat exchange circulation path or the cold storage flow path falls in a shower inside the container. With this configuration, the evaporation or condensation of the refrigerant can proceed efficiently. For example, even if a sufficient amount of solid refrigerant is stored in the evaporator, the refrigerant liquid continuously falls in a shower on the stored solid refrigerant. Therefore, the vapor-liquid interface necessary for production of the solid refrigerant is continuously ensured.

An eighth aspect of the present disclosure provides the refrigeration apparatus according to the second or third aspect, further including: a pump that draws and discharges the refrigerant liquid retained in the evaporator; and a controller that controls the pump and the compressor so that one of a thawing operation and a follow-up operation is selectively performed, the thawing operation being an operation in which the refrigerant liquid is allowed to circulate in the heat exchange circulation path via the heat exchanger while operation of the compressor is stopped, and the follow-up operation being an operation in which the refrigerant liquid is allowed to circulate in the heat exchange circulation path via the heat exchanger while the compressor is operated so as to cool the refrigerant liquid retained in the evaporator. By the function of the controller, the refrigeration apparatus can be operated in an appropriate operation mode.

A ninth aspect of the present disclosure provides the refrigeration apparatus according to the eighth aspect, wherein the controller further controls the pump and the compressor so that the cold storage operation is selectively performed, the cold storage operation being an operation in which the refrigerant liquid is allowed to circulate via the cold storage flow path while the compressor is operated so as to cool and solidify the refrigerant liquid inside the evaporator. By the function of the controller, the refrigeration apparatus can be operated in an appropriate operation mode.

A tenth aspect of the present disclosure provides the refrigeration apparatus according to the second or third aspect, further including a heat absorption circulation path including a heat absorption heat exchanger that heats a heat medium cooled in the heat exchanger, the heat absorption circulation path being adapted to allow the heat medium to circulate via the heat absorption heat exchanger. With this heat absorption circulation path, the entire length of the heat exchange circulation path can be reduced. This is significant when the refrigeration apparatus is operated under the pressure conditions lower than atmospheric pressure.

An eleventh aspect of the present disclosure provides the refrigeration apparatus according to the tenth aspect, wherein the heat absorption heat exchanger is an indoor heat exchanger to be disposed in an indoor space to cool the indoor space. The heat absorption circulation path is independent of the heat exchange circulation path. Therefore, there is no technical difficulty in extending the flow paths of the heat absorption circulation path from outdoor to indoor, and the heat absorption heat exchanger is suitable as an indoor heat exchanger for cooling the indoor space.

A twelfth aspect of the present disclosure provides the refrigeration apparatus according to the second or third aspect, further including: a condenser that condenses the refrigerant vapor compressed by the compressor; and a heat release circulation path including a heat release heat exchanger that cools the refrigerant liquid retained in the condenser or another heat medium heated in the condenser, the heat release circulation path being adapted to allow the refrigerant liquid or the another heat medium to circulate via the heat release heat exchanger. With the condenser and the heat release circulation path, the discharge pressure of the compressor can be set to a pressure sufficiently lower than atmospheric pressure. Therefore, the amount of work to be performed by the compressor is significantly reduced and the efficiency of the refrigeration apparatus can also be increased.

A thirteenth aspect of the present disclosure provides the refrigeration apparatus according to any one of the first to twelfth aspects, further including a heat storage body disposed inside the container, wherein the heat storage body includes a latent heat storage material having a melting point different from that of the refrigerant. According to the thirteenth aspect, heat or cold can be stored in the heat storage body using the latent heat of evaporation or the latent heat of condensation of the refrigerant.

A fourteenth aspect of the present disclosure provides the a refrigeration apparatus in which the container is a condenser that condenses a refrigerant vapor compressed by the compressor, and the heat storage flow path is used in a heat storage operation for storing heat in the condenser using latent heat of condensation of the refrigerant liquid. According to the fourteenth aspect, heat is stored in the condenser. A target (such as air in an indoor space) can be heated using the stored heat.

Hereinafter, embodiments of the present invention will be described with reference to the drawings. The embodiments given below are not intended to limit the present invention. In this description, the term "heat storage" is used to mean both storage of heat and storage of cold.

First Embodiment

Figure 1:
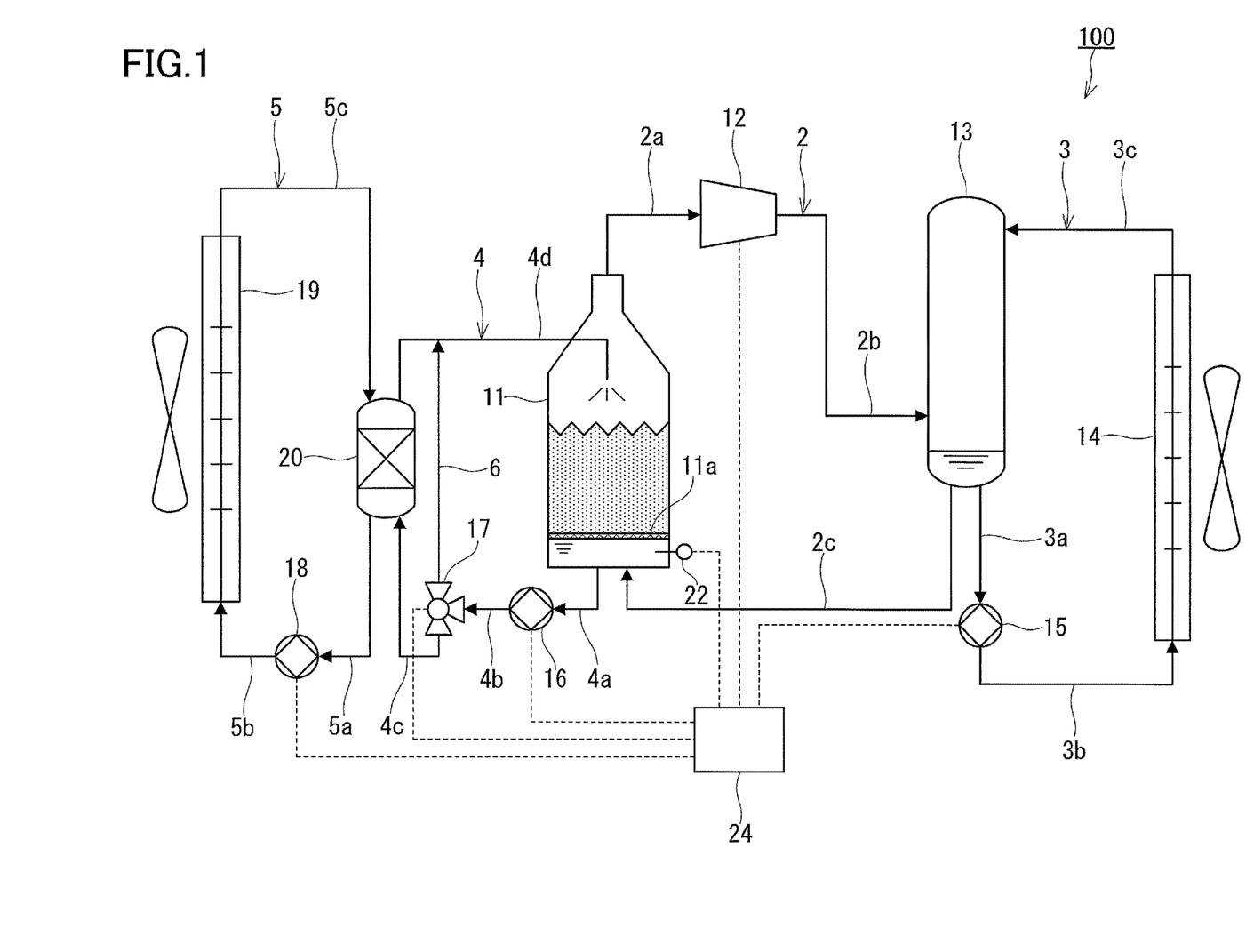
FIG. 1 is a configuration diagram of a refrigeration apparatus according to a first embodiment of the present invention.

As shown in FIG. 1, a refrigeration apparatus 100 of the present embodiment includes a main circuit 2, a heat release circulation path 3, a heat exchange circulation path 4, a heat absorption circulation path 5, a cold storage flow path 6, and a controller 24. Both ends of the heat release circulation path 3 are connected to the main circuit 2. Both ends of the heat exchange circulation path 4 also are connected to the main circuit 2.

The main circuit 2, the heat release circulation path 3, the heat exchange circulation path 4, and the cold storage flow path 6 are each loaded with a refrigerant whose saturated vapor pressure at ordinary temperature (20° C.±15° C.: Japanese Industrial Standards (JIS) Z 8703) is a negative pressure (a pressure that is lower than atmospheric pressure in terms of absolute pressure). An example of such a refrigerant whose saturated vapor pressure at ordinary temperature is a negative pressure is a refrigerant containing water, an alcohol, or an ether as a main component. The "main component" refers to a component whose content is the highest in terms of mass ratio. A refrigerant mixture containing two or more refrigerants may be used. While the refrigeration apparatus 100 is in operation, the pressure of the refrigerant is, for example, lower than atmospheric pressure in any part of the main circuit 2.

The main circuit 2 is a circuit in which a refrigerant is circulated, and includes an evaporator 11, a compressor 12, a condenser 13, and flow paths 2a to 2c. The evaporator 11, the compressor 12, and the condenser 13 are connected in a circuit by the flow paths 2a to 2c. The evaporator 11 and the condenser 13 are connected by the flow path 2c. Specifically, the bottom portion of the evaporator 11 and the bottom portion of the condenser 13 are connected by the flow path 2c. The flow path 2c is a refrigerant return path for returning a refrigerant liquid retained in the condenser 13 to the evaporator 11. A pressure reducing mechanism such as a capillary or an expansion valve may be provided in the refrigerant return path. The flow paths 2a to 2c are each formed of one or more pipes (refrigerant pipes). Flow paths 3a to 3d, flow paths 4a to 4d, and flow paths 5a to 5c described later are formed in the same manner.

The compressor 12 is connected to the evaporator 11 by the flow path 2a and is connected to the condenser 13 by the flow path 2b. The compressor 12 draws almost saturated refrigerant vapor from the evaporator 11 and compresses it. The high-temperature and superheated refrigerant vapor is discharged from the compressor 12 to the condenser 13. The compressor 12 may be a positive displacement compressor or a dynamic compressor. The compressor 12 may be composed of two or more compressors that are connected in series or in parallel. In the case where two or more compressors that are connected in series are used as the compressor 12, an intercooler for cooling the refrigerant vapor may be provided between the adjacent compressors. The intercooler may be an air-cooled intercooler or a water-cooled intercooler. When the intercooler is provided, the amount of compression work can be reduced and thus the efficiency of the refrigeration apparatus 100 is increased. In addition, the discharge temperature of the compressor 12 is reduced and thus the reliability of the compressor 12 is also increased.

The evaporator 11 is formed, for example, by a pressure-resistant container having thermal insulating properties (a vacuum container). In the present embodiment, the evaporator 11 serves not only as a reservoir for retaining the refrigerant liquid but also as a cold energy storage tank (typically an ice storage tank). The upstream end and the downstream end of the heat exchange circulation path 4 are connected to the evaporator 11. Specifically, the downstream end of the heat exchange circulation path 4 is connected to the upper portion of the evaporator 11, and the upstream end of the heat exchange circulation path 4 is connected to the bottom portion of the evaporator 11. The evaporator 11 is configured in such a manner that the refrigerant liquid returned from the heat exchange circulation path 4 to the evaporator 11 falls in the interior space of the evaporator 11. The refrigerant liquid may be sprayed from the downstream end of the heat exchange circulation path 4 into the interior space of the evaporator 11. The refrigerant liquid discharged from the downstream end of the heat exchange circulation path 4 is evaporated by the pressure reducing effect of the compressor 12. When a portion of the refrigerant is vaporized, the remaining portion of the refrigerant (the refrigerant liquid) is cooled directly by the latent heat of evaporation. When the temperature inside the evaporator 11 is lower than the solidification temperature of the refrigerant, a portion of the refrigerant liquid retained in the evaporator 11 is solidified inside the evaporator 11. Thereby, the solid refrigerant (for example, ice) is stored in the evaporator 11. In other words, cold energy is stored inside the evaporator 11 using the latent heat of the refrigerant (latent heat of evaporation of the refrigerant liquid). The compressor 12 allows latent heat of the refrigerant to be generated.

In particular, in the present embodiment, the downstream end of the heat exchange circulation path 4 is located in the upper portion of the evaporator 12, and the refrigerant liquid returned to the evaporator 11 after circulating through the heat exchange circulation path 4 falls in a shower inside the evaporator 11. With this configuration, even if a sufficient amount of solid refrigerant is stored in the evaporator 11, the refrigerant liquid continuously falls in a shower on the stored solid refrigerant. Therefore, the vapor-liquid interface necessary for production of the solid refrigerant is continuously ensured.

In the evaporator 11, a packing material may be disposed to form a liquid film from the refrigerant liquid discharged from the downstream end of the heat exchange circulation path 4. A regularly-arranged packing material or a randomly-arranged packing material can be used as the packing material. As the regularly-arranged packing material, a regularly-arranged packing material composed of layered corrugated plates can be used. As the randomly-arranged packing material, a randomly-arranged packing material obtained by assembling hollow, tubular structures can be used.

A filter 11a is provided in the lower portion of the evaporator 11. The filter 11a can prevent the solid refrigerant from being drawn into the heat exchange circulation path 4. An example of the filter 11a is a mesh made of a corrosion-resistant material such as a metal or a resin. Almost only the refrigerant liquid is retained below the filter 11a, although the sherbet-like solid refrigerant may be present in the refrigerant liquid. The upstream end (inlet) of the heat exchange circulation path 4 is located below the filter 11a in the vertical direction. In this positional relationship, only the refrigerant liquid can be selectively supplied to the heat exchange circulation path 4. In order to prevent the inlet of the heat exchange circulation path 4 from being closed by the solid refrigerant, the bottom portion of the evaporator 11 (located, for example, below the filter 11a) may be provided with a stirrer for stirring the retained refrigerant liquid. It should be noted that the inlet of the flow path 2a is located above the downstream end of the heat exchange circulation path 4 in the vertical direction. It is thus possible to prevent the refrigerant liquid from being drawn directly into the compressor 12.

The condenser 13 is formed, for example, by a pressure-resistant container having thermal insulating properties (a vacuum container). The condenser 13 serves to condense the refrigerant vapor compressed by the compressor 12. The upstream end and the downstream end of the heat release circulation path 3 are connected to the condenser 13. Specifically, the downstream end of the heat release circulation path 3 is connected to the upper portion of the condenser 13, and the upstream end of the heat release circulation path 3 is connected to the bottom portion of the condenser 13. The condenser 13 is configured in such a manner that the refrigerant liquid returned from the heat release circulation path 3 to the condenser 13 falls in the interior space of the condenser 13. The superheated refrigerant vapor discharged from the compressor 11 is condensed when it comes into direct contact with the refrigerant liquid falling in the interior space of the evaporator 11. When the refrigerant vapor is liquefied, latent heat is given to the refrigerant liquid falling in the interior space of the evaporator 11. Thereby, the high-temperature refrigerant liquid is produced. That is, heat is stored in the condenser 13 using the latent heat of condensation of the refrigerant liquid. The refrigerant liquid may be sprayed from the downstream end of the heat release circulation path 3 into the interior space of the condenser 13. The same packing material as that in the evaporator 11 may be disposed in the condenser 13.

The heat release circulation path 3 is formed by a pump 15, an outdoor heat exchanger 14 (a heat release heat exchanger), and flow paths 3a to 3c. The refrigerant liquid retained in the condenser 13 is circulated in the heat release circulation path 3 via the outdoor heat exchanger 14 by the function of the pump 15. The refrigerant liquid releases heat to the outside air in the outdoor heat exchanger 14 and is cooled. As the outdoor heat exchanger 14, a fin tube heat exchanger equipped with an air blower can be suitably used. As the outdoor heat exchanger 14, a plate heat exchanger may be used. For example, the refrigerant liquid can be cooled by cold water supplied from a cooling tower to the plate heat exchanger. The pump 15 may be a positive displacement pump or a dynamic pump. It is desirable that the pump 15 be disposed below the condenser 13 in the vertical direction in terms of preventing generation of bubbles. As the pump 15, two or more pumps that are connected in series or in parallel may be used.

As described later, if the refrigerant in an amount equivalent to the amount of the refrigerant vapor drawn into the compressor 12 is sequentially supplied to the evaporator 11, the condenser 13, the heat release circulation path 3, and the flow path 2c can also be omitted. However, the presence of the condenser 13, the heat release circulation path 3, and the flow path 2c makes it possible to set the discharge pressure of the compressor 12 to a pressure sufficiently lower than atmospheric pressure. Therefore, the amount of work to be performed by the compressor 12 is significantly reduced and the efficiency of the refrigeration apparatus 100 is also increased.

The condenser 13 does not necessarily need to be a direct contact heat exchanger, and it may be an indirect heat exchanger. In this case, the heat medium heated inside the condenser 13 circulates in the heat release circulation path 3, and is cooled in the outdoor heat exchanger 14. As the heat medium, water, ethylene glycol, a mixture of these, or the like can be used. Alternatively, the condenser 13 may be composed of an ejector and an extraction vessel. The ejector serves to produce a merged refrigerant flow using the refrigerant vapor compressed by the compressor 12 and the refrigerant liquid flowing from the outdoor heat exchanger 14. The extraction vessel serves to receive the merged refrigerant flow from the ejector and extract the refrigerant liquid from the merged refrigerant flow.

The heat exchange circulation path 4 is formed by a pump 16, a heat exchanger 20, and flow paths 4a to 4d. A three-way valve 17 is disposed in the heat exchange circulation path 4. The heat exchange circulation path 4 is a circulation path adapted to allow the refrigerant liquid retained in the evaporator 11 to circulate via the heat exchanger 20. As described later, the use of the heat exchange circulation path 4 makes it possible to selectively perform one of a space cooling operation (thawing operation) and a follow-up operation. The flow paths 4a to 4c form a feed flow path connecting the inlet of the heat exchanger 20 and the evaporator 11 (specifically, the lower portion of the evaporator 11). The flow path 4d forms a return flow path connecting the outlet of the heat exchanger 20 and the evaporator 11 (specifically, the upper portion of the evaporator 11). The cold storage flow path 6 connects the feed flow path and the return flow path.

The pump 16 draws and discharges the refrigerant liquid retained in the evaporator 11. As described previously, since almost only the refrigerant liquid is supplied to the heat exchange circulation path 4, the pump 16 does not need to be a special pump (such as a slurry pump). This contributes to a reduction in the cost of the refrigeration apparatus 100. The pump 16 may be a positive displacement pump or a dynamic pump. It is desirable that the pump 16 be disposed below the evaporator 11 in the vertical direction in terms of preventing generation of bubbles. As the pump 16, two or more pumps that are connected in series or in parallel may be used.

The refrigerant liquid discharged from the pump 16 is selectively supplied to the heat exchanger 20 or the cold storage flow path 6 by the function of the three-way valve 17. That is, the three-way valve 17 serves as a flow path switching mechanism for switching the flow path of the refrigerant liquid. The flow path switching mechanism selects either one of the heat exchange circulation path 4 and the cold storage flow path 6 as a flow path into which the refrigerant liquid flowing from the evaporator 11 should be introduced. The heat exchanger 20 is, for example, a plate heat exchanger.

The cold storage flow path 6 is a flow path used in the cold storage operation for storing the solid refrigerant in the evaporator 11. The cold storage flow path 6 is configured to allow the refrigerant liquid flowing from the evaporator 11 to return to the evaporator 11 without passing through the heat exchanger 20. In the present embodiment, the cold storage flow path 6 is branched from the heat exchange circulation path 4 at a branch point between the upstream end of the heat exchange circulation path 4 and the inlet of the heat exchanger 20 so that the refrigerant liquid flowing from the evaporator 11 bypasses the heat exchanger 20 and is returned to the evaporator 11. The three-way valve 17 as the flow path switching mechanism serves to select either one of the heat exchange circulation path 4 and the cold storage flow path 6 as a flow path into which the refrigerant liquid flowing from the evaporator 11 should be introduced. In other words, the three-way valve 17 is used to switch between one operation mode (a space cooling operation or a follow-up operation) in which the refrigerant liquid flowing from the evaporator 11 is supplied to the heat exchanger 20 and another operation mode (a cold storage operation) in which the refrigerant liquid flowing from the evaporator 11 is supplied to the cold storage flow path 6. The pressure loss of the refrigerant liquid can be reduced by introducing the refrigerant liquid into the cold storage flow path 6 so as to bypass the heat exchanger 20. With the use of the flow path switching mechanism such as the three-way valve 17, the refrigerant liquid can be introduced selectively into a desired flow path, and therefore the operation mode can be reliably switched.

In the present embodiment, the three-way valve 17 provided at the branch point between the heat exchange circulation path 4 and the cold storage flow path 6 is used as a flow path switching mechanism. As described later, two on-off valves can be used as a substitute for the three-way valve 17. However, it is desirable to use the three-way valve 17 in terms of suppressing an increase in the number of components.

In the present embodiment, the cold storage flow path 6 is branched from the heat exchange circulation path 4 at a branch point between the outlet of the pump 16 and the inlet of the heat exchanger 20. When the branch point is located at this position, the refrigerant liquid can be selectively supplied to the cold storage flow path 6 or the heat exchanger 20 using only one pump 16. This contributes to a reduction in the number of pumps, and, consequently, to a reduction in the cost of the refrigeration apparatus 100. It should be understood that the cold storage flow path 6 and the heat exchange circulation path 4 each may have its own pump.

In the present embodiment, the cold storage flow path 6 joins the heat exchange circulation path 4 at a point between the outlet of the heat exchanger 20 and the downstream end of the heat exchange circulation path 4. With this configuration, the total length of the heat exchange circulation path 4 and the cold storage flow path 6 can be reduced. However, the downstream end of the cold storage flow path 6 may be connected directly to the evaporator 11.

The heat absorption circulation path 5 is formed by a pump 18, a load-side heat exchanger 19 (heat absorption heat exchanger), and flow paths 5a to 5c. The upstream end and the downstream end of the heat absorption circulation path 5 are each connected to the heat exchanger 20. The heat absorption circulation path 5 is loaded with a liquid heat medium such as brine. A typical example of the brine is an aqueous solution of ethylene glycol. The heat medium circulates in the heat absorption circulation path 5 via the load-side heat exchanger 19 and the heat exchanger 20 by the function of the pump 18. The heat medium releases heat to the refrigerant and is cooled in the heat exchanger 20. The heat medium cooled in the heat exchanger 20 is heated in the load-side heat exchanger 19. As the load-side heat exchanger 19, a fin tube heat exchanger equipped with an air blower can be suitably used. The load-side heat exchanger 19 may be a radiation-based radiant panel. The load-side heat exchanger 19 can be an indoor heat exchanger to be disposed in an indoor space to cool the indoor space. The pump 18 may be a positive displacement pump or a dynamic pump. As the pump 18, two or more pumps that are connected in series or in parallel may be used.

With this heat absorption circulation path 5, the entire length of the heat exchange circulation path 4 (the total length of the flow paths 4a to 4d) can be reduced. This is significant when the refrigeration apparatus 100 is operated under the pressure conditions lower than atmospheric pressure. On the other hand, the heat absorption circulation path 5 is a circulation path in which a liquid heat medium such as brine circulates, and is independent of the heat exchange circulation path 4, the main circuit 2, and the heat release circulation path 3. Therefore, there is no technical difficulty in extending the flow paths 5a and 5b of the heat absorption circulation path 5 from outdoor to indoor, and the load-side heat exchanger 19 is suitable as an indoor heat exchanger for cooling the indoor space.

The controller 24 controls the compressor 12, the pump 15, the pump 16, the pump 18, and the three-way valve 17. A DSP (Digital Signal Processor) including an A/D conversion circuit, an input/output circuit, a computing circuit, a memory device, etc. can be used as the controller 24. In the controller 24, a program for properly operating the refrigeration apparatus 100 is stored.

The refrigeration apparatus 100 further includes a cold storage sensor 22. In the present embodiment, the cold storage sensor 22 is a temperature sensor, and is disposed inside the evaporator 11 so as to measure the temperature of the refrigerant liquid retained in the evaporator 11. Specifically, the cold storage sensor 22 is disposed below the filter 11a. When the solid refrigerant is stored in the evaporator 11, the temperature detected by the cold storage sensor 22 is close to the melting point of the refrigerant. When the solid refrigerant is completely melted, the temperature of the refrigerant liquid rises, and thus the temperature detected by the cold storage sensor 22 is higher than the melting point of the refrigerant. When too much solid refrigerant is stored in the evaporator 11 and the cold storage sensor 22 is covered with the solid refrigerant, the temperature detected by the cold storage sensor 22 is lower than the melting point of the refrigerant. Thus, the conditions inside the evaporator 11 can be seen by monitoring the temperature detected by the cold storage sensor 22.

Signals output from the cold storage sensor 22 are input to the controller 24. The controller 24 can switch the operation mode from one operation mode to another operation mode based on the detection result of the cold storage sensor 22. The controller 24 can also stop the operation of the refrigeration apparatus 100 based on the detection result of the cold storage sensor 22.

Next, the operation of the refrigeration apparatus 100 will be described.

The refrigeration apparatus 100 is operated in one of the cold storage operation mode, the space cooling operation (thawing operation) mode, and the follow-up operation mode. Generally, the cold storage operation is performed during the night time, while the space cooling operation is performed during the daytime. The cold storage operation is an operation in which the refrigerant liquid is allowed to circulate via the cold storage flow path 6 while the compressor 12 is operated so as to cool and solidify the refrigerant liquid inside the evaporator 11. The space cooling operation is an operation in which the refrigerant liquid is allowed to circulate in the heat exchange circulation path 4 via the heat exchanger 20 while the operation of the compressor 12 is stopped. The follow-up operation is an operation in which the refrigerant liquid is allowed to circulate in the heat exchange circulation path 4 via the heat exchanger 20 while the compressor 12 is operated so as to cool the refrigerant liquid retained in the evaporator 11. The controller 24 controls the pump 15, the pump 16, the pump 18, the three-way valve 17, and the compressor 12 so that one of the cold storage operation, the space cooling operation, and the follow-up operation is selectively performed. By the function of the controller 24, the refrigeration apparatus 100 can be operated in an appropriate operation mode.

(Cold Storage Operation)

In the cold storage operation, the solid refrigerant is stored in the evaporator 11. In the cold storage operation, the compressor 12, the pump 15, and the pump 16 are operated. The three-way valve 17 is set to a position for introducing the refrigerant liquid discharged from the pump 16 into the cold storage flow path 6 so as to bypass the heat exchanger 20. Since the refrigerant liquid bypasses the heat exchanger 20 and flows in the cold storage flow path 6, the pressure loss of the refrigerant liquid can be reduced. This means that the power required for the pump 16 can be reduced, and consequently, the efficiency of the refrigeration apparatus 100 is increased. The rotational speed of the compressor 12 is adjusted so that the temperature inside the evaporator 11 is equal to or lower than the melting point of the refrigerant (for example, 0° C. or lower). The refrigerant liquid solidifies inside the evaporator 11, and the refrigeration capacity equivalent to the latent heat (and the sensible heat) of the refrigerant is stored therein. The cold storage operation is terminated, for example, when the operation time of the compressor 12 reaches a predetermined time. Whether or not to terminate the cold storage operation may be determined based on the detection result of the cold storage sensor 22.

(Space Cooling Operation)

In the space cooling operation, the low-temperature refrigerant liquid obtained by melting of the solid refrigerant stored in the evaporator 11 is used to cool the indoor air. In the space cooling operation, the pump 16 and the pump 18 are operated. The three-way valve 17 is set to a position for allowing the refrigerant liquid discharged from the pump 16 to circulate in the heat exchange circulation path 4 via the heat exchanger 20. The low-temperature refrigerant liquid is produced by melting of the solid refrigerant inside the evaporator 11. The low-temperature refrigerant liquid is delivered to the heat exchanger 20 by the pump 16 and cools the heat medium (for example, brine) in the heat absorption circulation path 5. The heat medium cooled in the heat exchanger 20 is delivered to the load-side heat exchanger 19 by the pump 18 and removes heat from the indoor air. Thereby, the temperature in the indoor space is reduced. The space cooling operation is selected until the temperature of the refrigerant liquid retained in the evaporator 11 reaches a predetermined temperature (for example, 4° C.). As described previously, the temperature of the refrigerant liquid retained in the evaporator 11 is detected by the cold storage sensor 22.

As a measure to determine whether or not to terminate the space cooling operation, another temperature may be used instead of the temperature of the refrigerant liquid retained in the evaporator 11. For example, the temperature of the refrigerant liquid in the flow paths 4a to 4c between the refrigerant liquid outlet of the evaporator 11 and the inlet of the heat exchanger 20 or the temperature of the refrigerant pipes forming the flow paths 4a to 4c can be used as the above-mentioned measure. In some cases, the temperature of the heat medium in the flow paths 5a and 5b between the upstream end of the heat absorption circulation path 5 and the inlet of the load-side heat exchanger 19 may be used as the above-mentioned measure. Furthermore, the temperature of the refrigerant liquid retained in the evaporator 11 may be estimated based on these temperatures so as to use the estimated temperature as the above-mentioned measure.

(Follow-Up Operation)

In the follow-up operation, the compressor 12, the pump 15, the pump 16, and the pump 18 are operated. The three-way valve 17 is set to a position for allowing the refrigerant liquid discharged from the pump 16 to circulate in the heat exchange circulation path 4 via the heat exchanger 20. When the space has a cooling load and the temperature of the refrigerant liquid retained in the evaporator 11 is a predetermined temperature (for example 4° C.) or higher, the follow-up operation is selected as the operation mode of the refrigeration cycle apparatus 100. The phrase "the space has a cooling load" means that the space requires continued cooling. In the follow-up operation, the rotational speed of the compressor 12 is adjusted so that the refrigerant liquid retained in the evaporator 11 has a temperature close to a predetermined temperature (for example, 4° C.). It should be understood that any of the temperatures other than the temperature of the refrigerant liquid retained in the evaporator 11 may be used to control the compressor 12, as described previously.

When the temperature of the refrigerant liquid retained in the evaporator 11 rises to the predetermined temperature (for example, 4° C.) during the space cooling operation, the space cooling operation can be terminated and, instead, the follow-up operation can be performed by starting the compressor 12. Thus, the operation mode is switched from the space cooling operation to the follow-up operation.

As described above, according to the refrigeration apparatus 100 of the present embodiment, the whole ice storage/ice melting unit and one pump can be omitted from the components of the conventional refrigeration apparatus 300 shown in FIG. 8. A slurry pump for delivering the solid refrigerant also is not an essential component. Therefore, the cost reduction of the refrigeration cycle apparatus 100 can be expected by the reduction of the number of components.

Hereinafter, some modifications of the refrigeration apparatus will be described. The components of each modification which are the same as those of the refrigeration apparatus 100 shown in FIG. 1 are designated by the same reference numerals, and the description thereof is omitted. That is, the description of the refrigeration apparatus 100 can also apply to the following modifications as long as no technical contradiction arises.

(First Modification)

Figure 2:
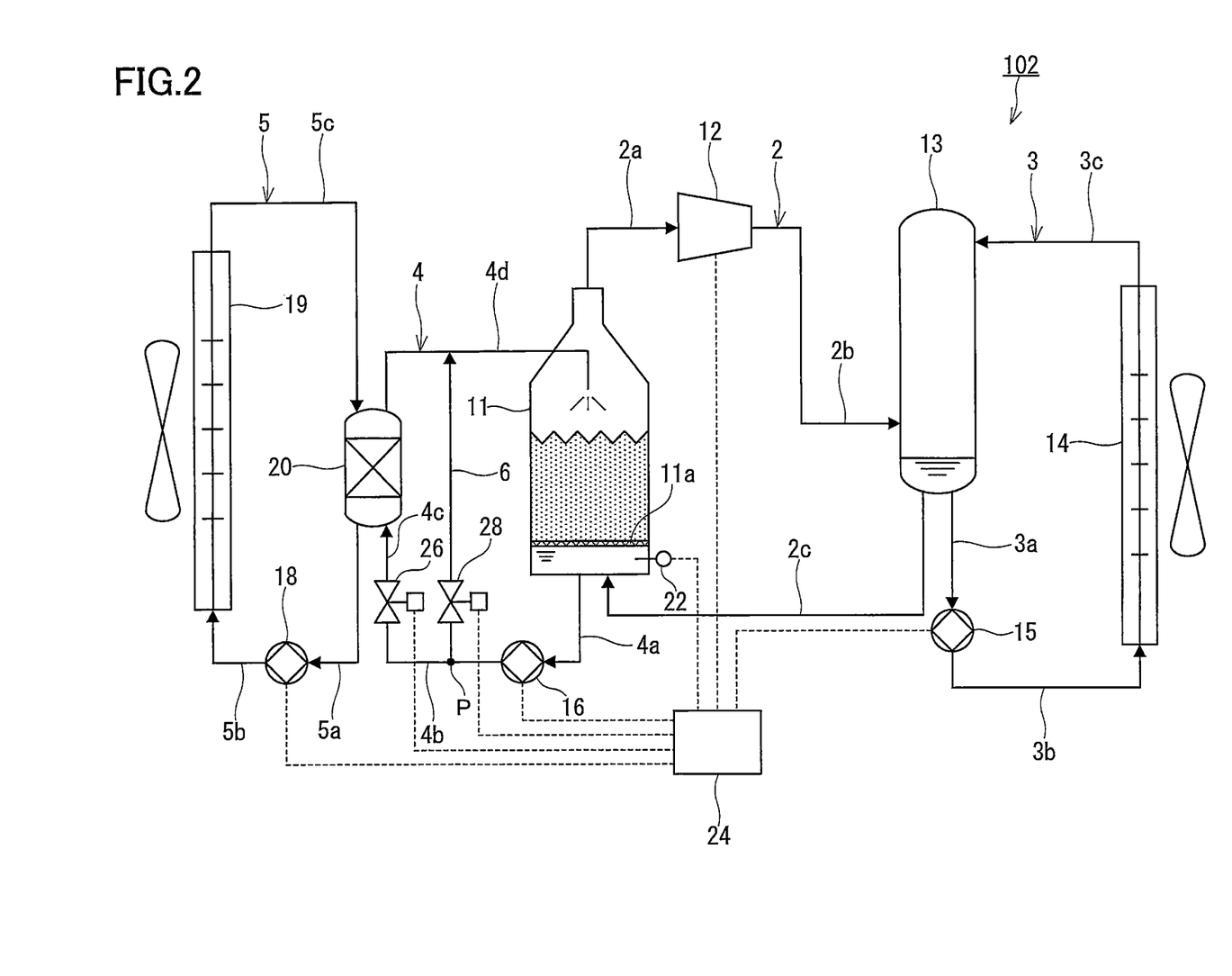
FIG. 2 is a configuration diagram of a refrigeration apparatus according to a first modification.

As shown in FIG. 2, a refrigeration apparatus 102 of the present modification includes on-off valves 26 and 28 in place of the three-way valve 17 as a flow path switching mechanism used to switch the operation mode. A first on-off valve 26 is provided in the heat exchange circulation path 4 at a position closer to the heat exchanger 20 than a branch point P of the cold storage flow path 6 from the heat exchange circulation path 4. In the present embodiment, the on-off valve 26 is provided in the flow path 4b connecting the outlet of the pump 16 and the inlet of the heat exchanger 20, at a position downstream of the branch point P. A second on-off valve 28 is provided in the cold storage flow path 6. In the case where the on-off valves 26 and 28 are provided at these positions, all the operation modes can be performed by disposing the pump 16 at a position upstream of the branch point P in the heat exchange circulation path 4. In addition, an on-off valve is less expensive and more reliable than a three-way valve. In particular, when the refrigeration apparatus 102 is operated under the pressure conditions lower than atmospheric pressure, it is desirable to use on-off valves in terms of improving the reliability.

(Second Modification)

Figure 3:
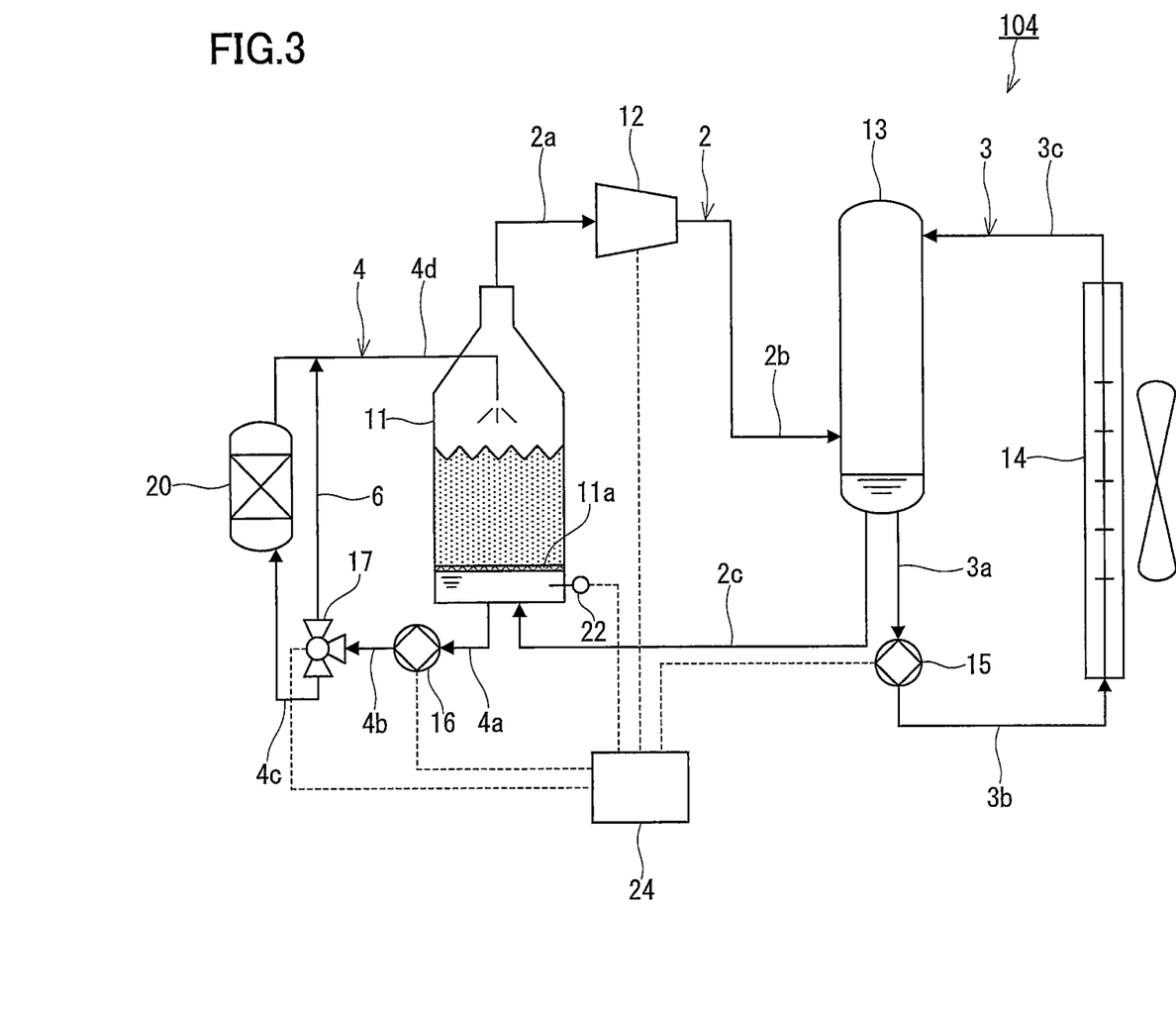
FIG. 3 is a configuration diagram of a refrigeration apparatus according to a second modification.

As shown in FIG. 3, a refrigeration apparatus 104 of the present modification is different from the refrigeration apparatus 100 shown in FIG. 1 in that the refrigeration apparatus 104 does not include the heat absorption circulation path 5. That is, the heat exchanger 20 in the heat exchange circulation path 4 can be used as an indoor heat exchanger. The present modification is more advantageous in terms of the number of components because the heat absorption circulation path 5 is omitted therefrom. However, the heat absorption circulation path 5 is effective as a means for minimizing the vacuum line. The other components of the refrigeration apparatus 104 are the same as those of the refrigeration apparatus 100.

(Third Modification)

Figure 4:
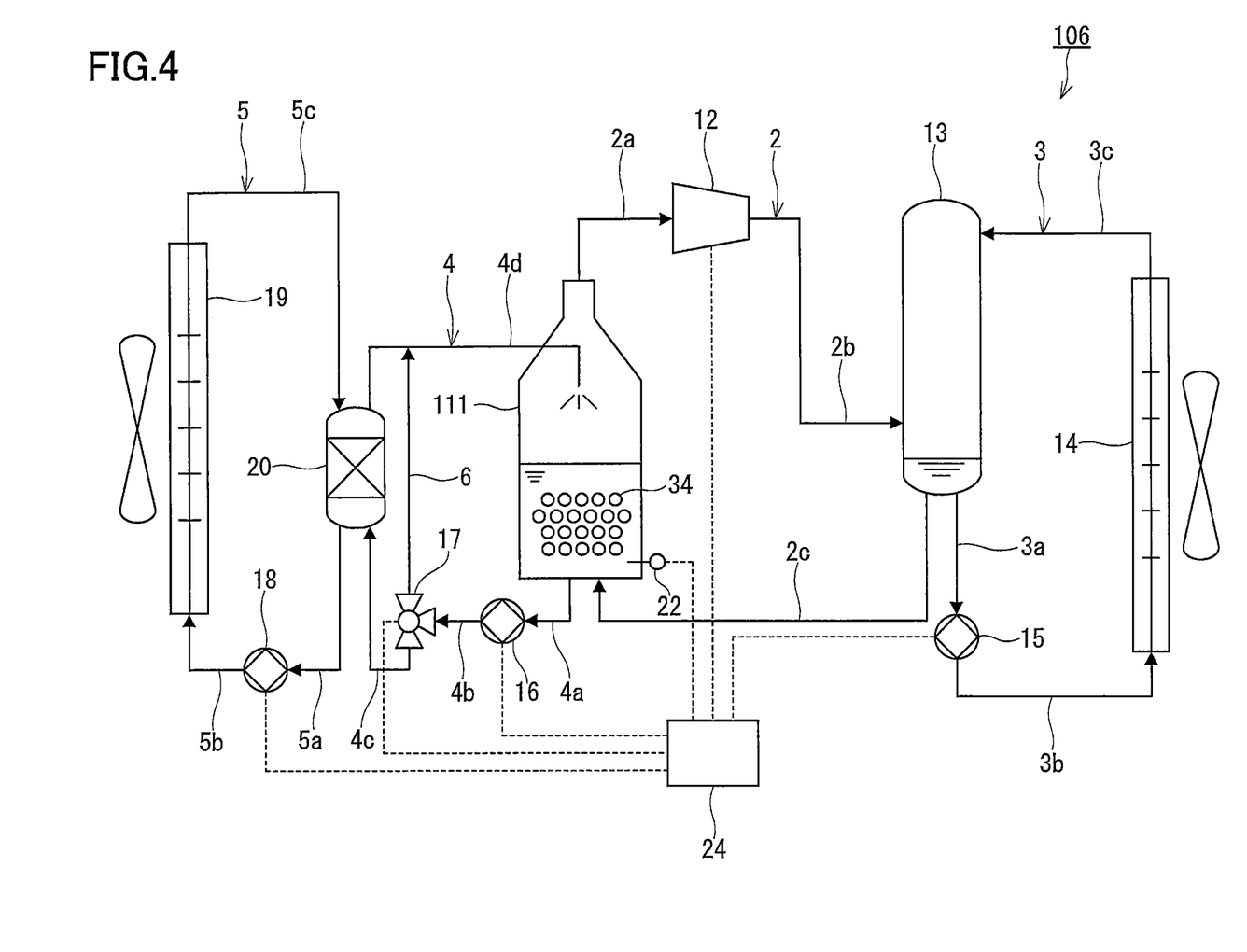
FIG. 4 is a configuration diagram of a refrigeration apparatus according to a third modification.

As shown in FIG. 4, a refrigeration apparatus 106 of the present modification includes two or more heat storage bodies 34 disposed inside the evaporator 111. The heat storage bodies 34 each is composed of, for example, a container and a latent heat storage material disposed in the container. Examples of the container include a laminated film container and a resin capsule. The melting point of the latent heat storage material is different from that of the refrigerant. In the present modification, the melting point of the latent heat storage material is higher than that of the refrigerant. For example, when the melting point of the refrigerant is 0° C., a latent heat storage material having a melting point in the range of 5 to 10° C. can be used for the heat storage body 34. According to the present modification, it is possible to cool the refrigerant liquid and the cold storage body 34 using the latent heat of evaporation of the refrigerant and to store the cold in the heat storage body 34. In particular, according to the present modification, it is possible to solidify the latent heat storage material in the heat storage body 34 even if the temperature of the refrigerant liquid retained in the evaporator 111 is higher than the melting point of the refrigerant. Thus, the pressure on the low-pressure side of the refrigeration cycle can be increased to reduce the amount of work to be performed by the compressor 12. In addition, according to the present modification, the type of the latent heat storage material in the heat storage body 34 can be changed as needed, which means that the refrigeration apparatus 106 has high design flexibility.

(Fourth Modification)

Figure 5:
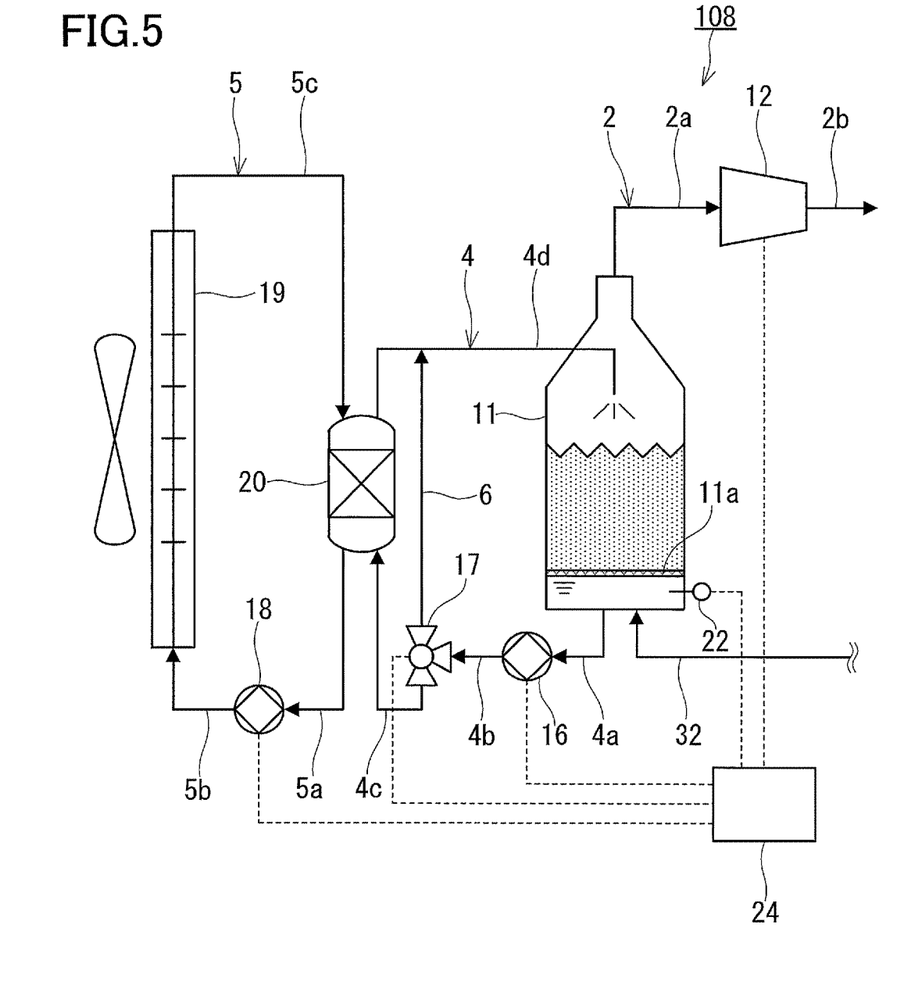
FIG. 5 is a configuration diagram of a refrigeration apparatus according to a fourth modification.

As shown in FIG. 5, a refrigeration apparatus 108 of the present modification is different from the refrigeration apparatus 100 shown in FIG. 1 in that the refrigeration apparatus 108 does not include the condenser 13, the heat release circulation path 3, and the flow path 2c. The pressure at the outlet of the compressor 12 is equal to atmospheric pressure. That is, the refrigeration apparatus 108 is an open cycle system in which compressed refrigerant vapor is released to the atmosphere. In place of the flow path 2c serving as a refrigerant return path, a refrigerant supply path 32 for sequentially supplying the refrigerant liquid (e.g., water) to the evaporator 11 is connected to the evaporator 11.

(Reference Example 1)

Figure 6:
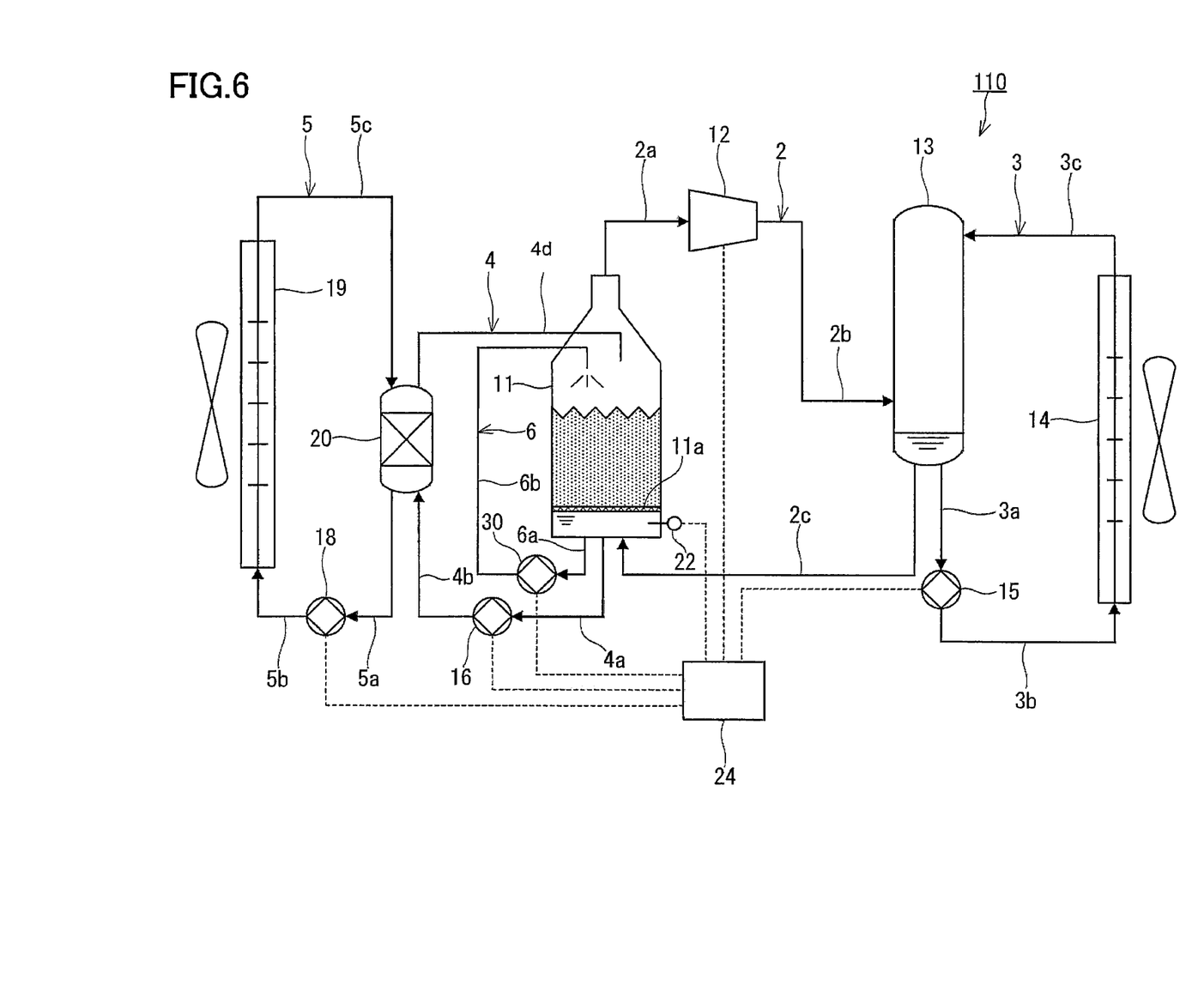
FIG. 6 is a configuration diagram of a refrigeration apparatus according to a reference example 1.

As shown in FIG. 6, a refrigeration apparatus 110 of Reference Example 1 is different from the refrigeration apparatuses 100, 102, 104, 106, and 108 described with reference to FIGS. 1 to 5 in that the cold storage flow path 6 is separated from the heat exchange circulation path 4. The cold storage flow path 6 is formed by a pump 30, a flow path 6a, and a flow path 6b. The pump 30 is a pump designed only for the cold storage flow path 6. The upstream end of the cold storage flow path 6 is connected to the bottom portion of the evaporator 11, and the downstream end thereof is connected to the upper portion of the evaporator 11. On the other hand, the structure of the heat exchange circulation path 4 is as described with reference to FIG. 1, except that the three-way valve 17 is omitted. The pump 16 is a pump designed only for the heat exchange circulation path 4. Thus, in the present modification, the cold storage flow path 6 does not share the pump and the flow paths with the heat exchange circulation path 4. The present modification does not require any flow path switching mechanism such as a three-way valve or an on-off valve.

The refrigerant liquid returned to the evaporator 11 after circulating through the heat exchange circulation path 4 falls in a shower inside the evaporator 11. The refrigerant liquid returned to the evaporator 11 after circulating through the cold storage flow path 6 (i.e., a cold storage circulation path) also falls in a shower inside the evaporator 11 in the same manner. Therefore, the refrigeration apparatus 106 of the present modification can be operated in any of the three operation modes, as in the case of the previously described refrigeration apparatus 100.

However, although the cold storage flow path 6 returns to the evaporator 11 independently of the heat exchange circulation path 4 in FIG. 6, the cold storage flow path 6 instead may join the heat exchange circulation path 4 at a position downstream of the heat exchanger 20. That is, the flow path 6b of the cold storage flow path 6 may be connected to the flow path 4d of the heat exchange circulation path 4 similar to the arrangement in FIGS. 1-5. In this case, the flow paths for returning the refrigerant liquid into the evaporator 11 can be combined into a single flow path, and therefore, a simple structure pipe can be used in the evaporator 11.

Second Embodiment

Figure 7:
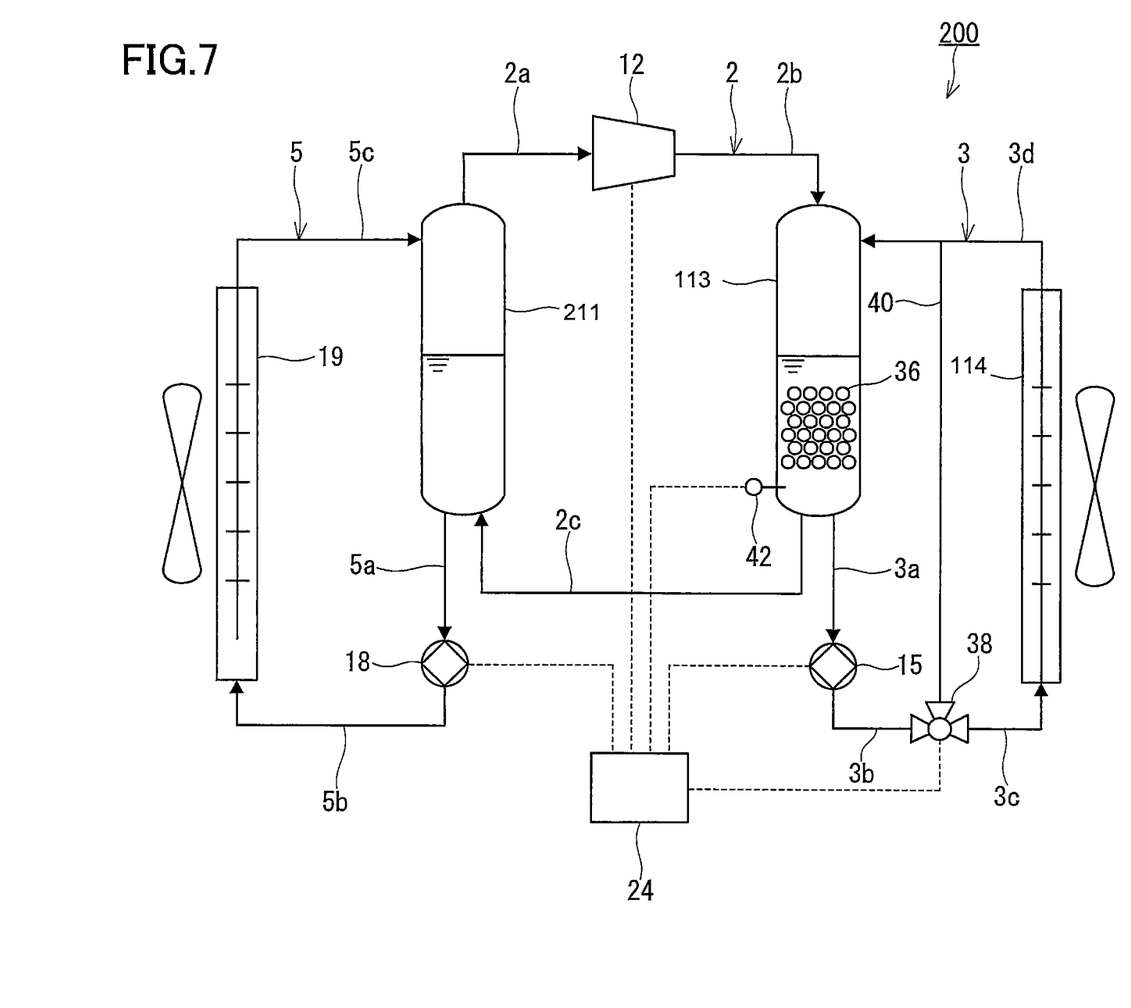
FIG. 7 is a configuration diagram of a refrigeration apparatus according to a second embodiment of the present invention.

As described previously, the refrigeration apparatus 100 of the first embodiment is configured to store cold inside the evaporator 11 using latent heat of evaporation of the refrigerant. By contrast, a refrigeration apparatus 200 of the present embodiment is configured to store heat inside the condenser 113 using latent heat of condensation of the refrigerant.

As shown in FIG. 7, in the present embodiment, the heat release circulation path 3 is formed by the pump 15, the heat exchanger 114 (an indoor heat exchanger), and flow paths 3a to 3d. A three-way valve 38 is disposed in the heat release circulation path 3. The heat release circulation path 3 is a circulation path adapted to allow the refrigerant liquid retained in the condenser 113 to circulate via the heat exchanger 114. The flow paths 3a to 3c form a feed flow path connecting the inlet of the heat exchanger 114 and the condenser 113 (specifically, the lower portion of the condenser 113). The flow path 3d forms a return flow path connecting the outlet of the heat exchanger 114 and the condenser 113 (specifically, the upper portion of the condenser 113). The feed flow path and the return flow path are connected by a heat storage flow path 40. The refrigerant liquid discharged from the pump 15 is selectively supplied to the heat exchanger 114 or the heat storage flow path 40 by the function of the three-way valve 38. That is, the three-way valve 38 serves as a flow path switching mechanism for switching the flow path of the refrigerant liquid.

The refrigeration apparatus 200 further includes a heat storage sensor 42. In the present embodiment, the heat storage sensor 42 is a temperature sensor, and is disposed inside the condenser 113 so as to measure the temperature of the refrigerant liquid retained in the condenser 113.

The heat storage flow path 40 is a flow path used in the heat storage operation for storing the high-temperature refrigerant liquid in the condenser 113. The heat storage flow path 40 is configured to allow the refrigerant liquid flowing from the condenser 113 to return to the condenser 113 without passing through the heat exchanger 114. In the present embodiment, the heat storage flow path 40 is branched from the heat release circulation path 3 at a branch point between the upstream end of the heat release circulation path 3 (a heat exchange circulation path) and the inlet of the heat exchanger 114 so that the refrigerant liquid flowing from the condenser 113 bypasses the heat exchanger 114 and is returned to the condenser 113. The three-way valve 38 as a flow path switching mechanism serves to select either one of the heat release circulation path 3 and the heat storage flow path 40 as a flow path into which the refrigerant liquid flowing from the condenser 113 should be introduced. In other words, the three-way valve 38 is used to switch between one operation mode (the space heating operation or the follow-up operation) in which the refrigerant liquid flowing from the condenser 113 is supplied to the heat exchanger 114 and another operation mode (the heat storage operation) in which the refrigerant liquid flowing from the condenser 113 is supplied to the heat storage flow path 40. The pressure loss of the refrigerant liquid can be reduced by introducing the refrigerant liquid into the heat storage flow path 40 so as to bypass the heat exchanger 114. With the use of the flow path switching mechanism such as the three-way valve 38, the refrigerant liquid can be introduced selectively into a desired flow path, and therefore the operation mode can be reliably switched.

Also in the present embodiment, the three-way valve 38 provided at the branch point of the heat storage flow path 40 from the heat release circulation path 3 is used as a flow path switching mechanism. As described previously, two on-off valves can be used in place of the three-way valve 38.

In the present embodiment, the heat storage flow path 40 is branched from the heat release circulation path 3 at a point between the outlet of the pump 15 and the inlet of the heat exchanger 114. When the branch point is located at this position, the refrigerant liquid can be selectively supplied to one of the heat storage flow path 40 and the heat exchanger 114, with the use of only one pump 15. This contributes to a reduction in the number of pumps, and, consequently, to a reduction in the cost of the refrigeration apparatus 200. It should be understood that the heat storage flow path 40 and the heat release circulation path 3 each may have its own pump.

In the present embodiment, the heat storage flow path 40 joins the heat release circulation path 3 at a point between the outlet of the heat exchanger 114 and the downstream end of the heat release circulation path 3. With this configuration, the total length of the heat release circulation path 3 and the heat storage flow path 40 can be reduced. However, the downstream end of the heat storage flow path 40 may be connected directly to the condenser 13.

Two or more heat storage bodies 36 are disposed inside the condenser 13. The heat storage bodies 36 each is composed of, for example, a container and a latent heat storage material disposed in the container. Examples of the container include a laminated film container and a resin capsule. For example, a latent heat storage material having a melting point in the range of 40 to 50° C. can be used for the heat storage body 36. According to the present embodiment, it is possible to heat the heat storage body 36 using the latent heat of condensation of the refrigerant and to store the heat in the heat storage body 36. In addition, the latent heat of the latent heat storage material can be used, and therefore the size of the condenser 113 can be potentially reduced, compared to the case where only the sensible heat of the refrigerant liquid is used. However, the heat storage body 36 is not essential to the refrigeration apparatus 200. The high-temperature refrigerant liquid may be stored inside the condenser 113 using the latent heat of condensation of the refrigerant so as to perform the space heating operation to be described later using the sensible heat of the refrigerant liquid.

Also in the present embodiment, a heat exchange circulation path may be provided separately from the heat release circulation path 3, as in the case of the first embodiment.

(Heat Storage Operation)

In the heat storage operation, the high-temperature refrigerant liquid is stored in the condenser 113. In the heat storage operation, the compressor 12, the pump 15, and the pump 18 are operated. The three-way valve 38 is set to a position for introducing the refrigerant liquid discharged from the pump 15 into the heat storage flow path 40 so as to bypass the heat exchanger 20. Since the refrigerant liquid bypasses the heat exchanger 114 and flows in the heat storage flow path 40, the pressure loss of the refrigerant liquid can be reduced. This means that the power required for the pump 15 can be reduced, and consequently, the efficiency of the refrigeration apparatus 200 is increased. The refrigerant vapor condenses inside the condenser 113, and the heating capacity equivalent to the latent heat of condensation of the refrigerant is stored therein. The heat storage operation is terminated, for example, when the operation time of the compressor 12 reaches a predetermined time. Whether or not to terminate the heat storage operation may be determined based on the detection result of the cold storage sensor 42.

(Space Heating Operation)

In the space heating operation, the high-temperature refrigerant liquid stored in the condenser 113 and the heat storage body 36 disposed therein are used to heat the indoor air. In the space heating operation, the pump 15 is operated. The three-way valve 38 is set to a position for allowing the refrigerant liquid discharged from the pump 15 to circulate in the heat release circulation path 3 via the heat exchanger 114. The high-temperature refrigerant liquid is delivered to the heat exchanger 114 by the pump 15, and heats the indoor air. Thus, the temperature of the indoor space is raised. The space heating operation is selected until the temperature of the refrigerant liquid retained in the condenser 113 reaches a predetermined temperature (for example, 35° C.) or lower. This predetermined temperature can be a temperature lower than the melting point of the latent heat storage material used in the heat storage body 36. That is, in the space heating operation, the latent heat of the latent heat storage material can be used.

As a measure to determine whether or not to terminate the space heating operation, another temperature may be used instead of the temperature of the refrigerant liquid retained in the condenser 113. For example, the temperature of the refrigerant liquid in the flow paths 3a to 3c between the refrigerant liquid outlet of the condenser 113 and the inlet of the heat exchanger 114 or the temperature of the refrigerant pipes forming the flow paths 3a to 3c can be used as the above-mentioned measure. Furthermore, the temperature of the refrigerant liquid retained in the condenser 113 may be estimated based on these temperatures so as to use the estimated temperature as the above-mentioned measure.

(Follow-Up Operation)

In the follow-up operation, the compressor 12, the pump 15, and the pump 18 are operated. The pump 18 circulates refrigerant from the evaporator 211 to the heat exchanger 19 via flow paths 5a and 5b. The refrigerant returns to the evaporator via flow path 5c. The three-way valve 38 is set to a position for allowing the refrigerant liquid discharged from the pump 15 to circulate in the heat release circulation path 3 via the heat exchanger 114. When the space has a heating load and the temperature of the refrigerant liquid retained in the condenser 113 is a predetermined temperature (for example 35° C.) or lower, the follow-up operation is selected as the operation mode of the refrigeration cycle apparatus 200. The phrase "the space has a heating load" means that the space requires continued heating.

When the temperature of the refrigerant liquid retained in the condenser 113 drops to a predetermined temperature (for example, 35° C.) or lower during the space heating operation, the space heating operation can be terminated and, instead, the follow-up operation can be performed by starting the compressor 12. Thus, the operation mode is switched from the space heating operation to the follow-up operation.

As described above, according to the refrigeration apparatus 200 of the present embodiment, the cost reduction of the refrigeration cycle apparatus 200 can be expected by the reduction of the number of components.

INDUSTRIAL APPLICABILITY

The technology disclosed in the present description is useful for air conditioners such as household air conditioners and industrial air conditioners.

The invention claimed is:

1. A refrigeration apparatus comprising:
an evaporator that retains a liquid phase refrigerant that is evaporated to produce a vapor phase refrigerant, and in which cold is stored using latent heat of the refrigerant;
a compressor that is connected to the evaporator and compresses the vapor phase refrigerant;
a heat exchange circulation path comprising: a heat exchanger; a feed flow path having an upstream end connected to the evaporator to receive the liquid phase refrigerant stored in the evaporator, and connecting an inlet of the heat exchanger and the evaporator to deliver the liquid phase refrigerant from the evaporator to the inlet of the heat exchanger; and a return flow path connecting an outlet of the heat exchanger and the evaporator to return the liquid phase refrigerant from the heat exchanger to the evaporator, the heat exchange circulation path being adapted to allow the liquid phase refrigerant retained in the evaporator to circulate via the heat exchanger;
a cold storage flow path that is a flow path used in a cold storage operation for storing cold in the evaporator, the cold storage flow path having an upstream end connected to the feed flow path at a point between the evaporator and the heat exchanger of the heat exchange circulation path, and connecting the feed flow path and the return flow path, the cold storage flow path being configured to allow the liquid phase refrigerant flowing from the evaporator to return to the evaporator without passing through any heat exchanger of the refrigeration apparatus; and
a three-way valve or two on-off valves controlled to select one of the heat exchange circulation path and the cold storage flow path as a flow path into which the liquid phase refrigerant flowing from the evaporator should be introduced, wherein
the refrigeration apparatus is configured so that the compressor draws a refrigerant vapor from the evaporator so as to promote evaporation of the liquid phase refrigerant retained in the evaporator, and compresses the vapor phase refrigerant drawn from the evaporator.

2. The refrigeration apparatus according to claim 1, wherein
in the cold storage operation, part of the liquid phase refrigerant is stored in the evaporator as refrigerant in solid form.

3. The refrigeration apparatus according to claim 1, wherein the three-way valve is provided at the branch point of the cold storage flow path from the heat exchange circulation path.

4. The refrigeration apparatus according to claim 1, wherein a first one of the on-off valves is provided in the heat exchange circulation path at a position closer to the heat exchanger than the branch point of the cold storage flow path from the heat exchange circulation path; and a second one of the on-off valves is provided in the cold storage flow path.

5. The refrigeration apparatus according to claim 1, wherein the liquid phase refrigerant received from the evaporator by the feed flow path and returned to the evaporator falls in a shower inside the evaporator.

6. The refrigeration apparatus according to claim 1, further comprising:
a pump that draws and discharges the liquid phase refrigerant retained in the evaporator; and
a controller that controls the pump and the compressor so that one of a thawing operation and a follow-up operation is selectively performed, the thawing operation being an operation in which the liquid phase refrigerant is allowed to circulate in the heat exchange circulation path via the heat exchanger while operation of the compressor is stopped, and the follow-up operation being an operation in which the liquid phase refrigerant is allowed to circulate in the heat exchange circulation path via the heat exchanger while the compressor is operated so as to cool the liquid phase refrigerant retained in the evaporator.

7. The refrigeration apparatus according to claim 6, wherein in the cold storage operation, part of the liquid phase refrigerant is stored in the evaporator as refrigerant in solid form.

8. The refrigeration apparatus according to claim 1, further comprising a heat absorption circulation path comprising a heat absorption heat exchanger that heats a heat medium cooled in the heat exchanger of the heat exchange circulation path, the heat absorption circulation path being adapted to allow the heat medium to circulate via the heat absorption heat exchanger.

9. The refrigeration apparatus according to claim 8, wherein the heat absorption heat exchanger is an indoor heat exchanger to be disposed in an indoor space to cool the indoor space.

10. The refrigeration apparatus according to claim 1, further comprising:
    a condenser that condenses the refrigerant vapor compressed by the compressor; and
    a heat release circulation path comprising a heat release heat exchanger that cools the liquid phase refrigerant retained in the condenser or another heat medium heated in the condenser, the heat release circulation path being adapted to allow the liquid phase refrigerant or the another heat medium to circulate via the heat release heat exchanger.

11. The refrigeration apparatus according to claim 1, further comprising a heat storage body disposed inside the evaporator, wherein
    the heat storage body comprises a latent heat storage material having a melting point different from that of the refrigerant.

12. The refrigeration apparatus according to claim 1, further comprising a filter that is disposed inside the evaporator and prevents the refrigerant in solid form from being drawn into the feed flow path.

13. The refrigeration apparatus according to claim 1, further comprising a heat storage body disposed inside the evaporator, wherein
    the heat storage body comprises a second container and a latent heat storage material disposed in the second container.

14. The refrigeration apparatus according to claim 1, wherein
    the compressor is a dynamic compressor.

15. The refrigeration apparatus according to claim 1, wherein
    a pressure loss of the liquid phase refrigerant when the liquid phase refrigerant is introduced into the cold storage flow path is smaller than a pressure loss of the liquid phase refrigerant when the liquid phase refrigerant is introduced into the heat exchange circulation path.

* * * * *